(12) United States Patent
Bosserman

(10) Patent No.: US 6,387,300 B1
(45) Date of Patent: May 14, 2002

(54) METHOD FOR TREATING CALCIUM BORATE ORES TO OBTAIN USEFUL BORON COMPOUNDS

(76) Inventor: Thomas L. Bosserman, 9011 Front St., Fort Wayne, IN (US) 46818

( * ) Notice: Subject to any disclaimer, the term of this patent is extended or adjusted under 35 U.S.C. 154(b) by 0 days.

(21) Appl. No.: 09/763,398
(22) PCT Filed: Aug. 13, 1999
(86) PCT No.: PCT/US99/18317
 § 371 Date: Feb. 16, 2001
 § 102(e) Date: Feb. 16, 2001
(87) PCT Pub. No.: WO00/09326
 PCT Pub. Date: Feb. 24, 2000

Related U.S. Application Data
(60) Provisional application No. 60/096,764, filed on Aug. 17, 1998.

(51) Int. Cl.$^7$ .......................... C09K 21/02; B32B 9/04; A01N 59/14
(52) U.S. Cl. ...................... 252/607; 252/602; 106/18.3
(58) Field of Search ................................. 252/602, 607; 424/657, 602; 106/18.3

(56) References Cited

U.S. PATENT DOCUMENTS

| | | | |
|---|---|---|---|
| 3,865,760 A | 2/1975 | Pitts et al. .............. 260/2.5 AJ |
| 4,064,317 A | 12/1977 | Fukuba et al. .............. 428/537 |
| 4,065,413 A | * 12/1977 | MacInnis et al. | |
| 4,076,580 A | 2/1978 | Panusch et al. ............. 162/159 |
| 4,126,473 A | 11/1978 | Sobolev et al. .......... 106/15 FP |
| 4,196,177 A | 4/1980 | Salley ........................ 423/279 |
| 4,292,188 A | 9/1981 | Barone et al. ................ 252/62 |
| 4,363,798 A | 12/1982 | D'Orazio ..................... 424/84 |
| 4,382,025 A | 5/1983 | Sallay ........................ 252/607 |
| 4,504,546 A | 3/1985 | Sallay ........................ 428/375 |
| 4,514,326 A | 4/1985 | Sallay ........................ 252/602 |
| 4,544,409 A | 10/1985 | Daussan et al. ......... 106/18.14 |
| 4,619,776 A | 10/1986 | Mondshine .............. 252/8.551 |
| 4,731,265 A | * 3/1988 | Hirao et al. ................ 427/440 |
| 4,804,524 A | 2/1989 | Polendo-Loredo .......... 423/283 |
| 4,873,084 A | 10/1989 | Sallay ........................ 424/658 |
| 5,034,056 A | 7/1991 | von Bonin ............... 106/18.12 |
| 5,055,135 A | 10/1991 | Grude et al. ............. 106/281.1 |
| 5,435,821 A | 7/1995 | Duvdevani et al. ............ 71/28 |

* cited by examiner

*Primary Examiner*—Joseph D. Anthony
(74) *Attorney, Agent, or Firm*—Brinks Hofer Gilson & Lione

(57) ABSTRACT

A method for producing products for treating wood and other cellulose products to improve the flame retardancy, and the insecticidal and fungicidal properties of the products. A calcium borate ore, such as colemanite, is reacted first with an acid such as acetic acid. The reaction products, including calcium in solution, are then treated with ammonia, producing ammonium pentaborate. The resulting composition is applied to the wood or other cellulose products by methods such as pressure, diffusion, or immersion and/or dipping treatment. The products have superior leach resistance to water when compared to conventional treatment compounds.

18 Claims, No Drawings

METHOD FOR TREATING CALCIUM BORATE ORES TO OBTAIN USEFUL BORON COMPOUNDS

This application is a 371 of PCT/US99/18317 filed Aug. 13, 1999 which claims benefit of Provisional No. 60/096,764 filed Aug. 17, 1998.

BACKGROUND OF THE INVENTION

The present invention relates to a method for treating calcium borate ores to obtain useful boron-containing compounds. The invention also relates to the use of the resulting boron-containing compounds in the treatment of wood and other related wood-based products to protect such products against fungal attack, and against attack by subterranean termites and wood-boring insects such as powder-post beetles and carpenter ants. The invention further relates to the use of the boron-containing compounds to improve the flame retardancy of wood and wood products. Still further, the invention relates to the boron-containing compounds prepared by the inventive method for treating calcium borates.

Typically, wood and other cellulose products such as plywood and oriented strand board (OSB), are exposed to a wide range of weather and environmental conditions. During the useful lifetimes of such products, they may also become exposed to fungi, and/or they may become prey to various boring or wood-eating insects. Similarly, such products may become exposed to fire. Such exposure to fungi and insects hastens the degradation of the products. Exposure to fire or flames increases the risk of loss of life and property.

Methods and compositions for treating wood and cellulose products to provide at least some protection against such conditions are known in the art. In one such method, cellulose products are treated with a composition comprising sodium sulfate and ammonium pentaborate. This composition is generally obtained as a result of the reaction between sodium borates (borax) and ammonium sulfate in water. However, ammonium pentaborate is soluble in water. Therefore, the composition gradually leaches out of the treated wood or cellulose upon repeated exposure to outdoor moisture, such as rain.

Attempts have been made to minimize the leaching of the ammonium pentaborate by adding soluble calcium salts to the sodium sulfate/ammonium pentaborate composition, to obtain a second set of reaction products that is less prone to leaching out of the wood or wood products. However, results with the calcium salts have met with only limited success, as the post-addition of the calcium salts to the sodium sulfate/ammonium pentaborate composition generates insoluble calcium compounds and/or calcium borates, causing those insoluble products to precipitate out of the solution before application; Besides making the application more difficult, the above-described process can remove both calcium and borates from the composition to be applied to the wood, thereby decreasing the effectiveness of the composition. In order to avoid this condition a second set of reaction conditions would be required (secondary application to treated wood), thereby necessitating an additional treatment step to produce the desired products.

Calcium borate ores have previously been used as components in dry powder flame-retardant formulations. One such use was described in U.S. Pat. No. 3,865,760, to Pitts, et al., wherein the ore colemanite (or alternatively, the ores ulexite or pandermite) was used as a filler in a rubber and plastic dry powder formulation, alone or in combination with alumina trihydrate and calcium carbonate. In this formulation, high levels of unreacted dry colemanite were required in order to receive the desired flame-retardant effect.

Another such use was described in U.S. Pat. No. 4,076,580 to Panusch, et al. This patent discloses a process for producing flame-retardant cellulosic board, comprising treating the board with a "synergistically acting" composition consisting of alumina hydrate and ulexite. The combination requires loadings for flame retardation at high levels that sometimes interfered with the board properties.

Another use was described in U.S. Pat. No. 4,126,473 to Sobolev, et al. This patent discloses a three-component flame-retarding agent consisting of an "aluminous" material, a boron-containing mineral such as colemanite or ulexite, and a "co-synergist", namely a phosphate or sulfate-containing inorganic salt.

The use of the calcium borate ores colemanite and ulexite as a termite bait was described in U.S. Pat. No. 4,363,798 to D'Orazio. This patent describes a method for protecting a structure from termites, in which a composition comprising wood inoculated with brown rot fungus is used as an attractant. The wood is ground into sawdust, and mixed with a boron-containing toxicant, such as colemanite or ulexite. The termite bait or attractant is then placed in close proximity to a wood structure to be protected, so that termites will be attracted to the bait.

Attempts have also been made to obtain treatment solutions for either flame retardation or for the protection from wood decay fungi, termites and wood-boring insects using water-soluble sodium borates. However, since sodium borates are highly soluble in water, these products do not provide adequate resistance to leaching after the application to wood or wood products.

U.S. Pat. No. 4,873,084 to Sallay discloses an insecticidal composition utilizing ammonium pentaborate and a mildewcide. This patent discusses the insecticidal activity of ammonium pentaborates. Ammonium pentaborates are precursors to boric acid, which is formed during ingestion by the insect. The patent states that certain calcium and barium triborates act in a similar fashion to produce boric acid in vivo in insects, the boric acid being toxic to insects. In the process described in this patent, wood previously treated with ammonium pentaborate is secondarily treated with various barium and calcium salts to cause a chemical change to a less soluble barium and/or calcium borate product. A mildewcide such as Busan® or Tyrosan® is added to control wood-boring insects and wood decay fungi.

Another Sallay patent, namely U.S. Pat. No. 4,514,326, discloses a flame retardant composition comprising ammonium pentaborate, and an alkali and/or alkaline earth metal sulfate, sulfite, hydrophosphate, or mixtures of them. The reaction products are produced by heating an aqueous suspension of a metal tetraborate ore, and then reacting the resulting product with an animonium salt, such as ammonium sulfate. The disclosure states that the role of the by-product alkali salts is to increase the solubility of ammonium pentaborate in water. This patent does not address the problem of leaching away of soluble ammonium pentaborate that occurs with the use of water-soluble borates.

SUMMARY OF THE INVENTION

According to the present invention, leach-resistant compounds are produced from a reaction between naturally occurring calcium borate ores, such as colemanite, and an acid, such as acetic acid; and then treating the reaction products with ammonia. When applied to substrates such as wood and other cellulose products, the resultant compounds in a water-based solution provide enhanced flame retardancy protection, and provide enhanced protection against attack by wood decay fungi and insects.

The present invention utilizes naturally-occurring calcium borate ores that are extremely insoluible in water, and produces a compound or compounds that are soluble in water, thereby facilitating the preparation of the treatment solution, and the resulting application of the solution to the wood. The treated wood shows dramatic resistance to leaching by water after treatment and drying.

The invention advantageously utilizes the naturally bound calcium of the calcium borate ores to provide the increased resistance to leaching without the need of any post-treatment after the initial application. The calcium compound or compounds that are produced are placed in solution, and thereafter remain in solution. The compound or compounds so produced are apparently just as stable in solution as other borates similarly made from water-soluble sodium borates. Upon cold precipitation, the compounds may be reintroduced into solution upon heating.

DETAILED DESCRIPTION OF THE INVENTION

It has been discovered that when certain naturally-occurring calcium borate ores, such as colemanite, are reacted with an appropriate acid, such as acetic acid, and the resulting reaction products are further reacted with ammonia, that the calcium from the ores is placed in solution.

When the solution containing the dissolved calcium is thereafter applied a substrate, such as wood or other cellulose-based products such as plywood, particle board or oriented strand board (OSB), the resulting compounds of the solution have superior leach resistance when compared to the leach resistance obtained by other water-based compounds, such as water-based sodium salts. When utilizing the dissolved-calcium solution of the present invention in this manner, a high level of leach-resistant boron remains in the substrate even after prolonged exposure to the elements. As a result, the treated wood is protected against attack from wood decay fungi, and from subterranean termites and wood-boring insects such as powder-post beetles and carpenter ants. Furthermore, the retention level of boron in the substrate surpasses the level required for visible exposure of the treated wood. In addition, treating such substrates with the inventive solution provides enhanced flame retardancy protection.

According to the present invention, calcium borate ores are reacted with a specified acid to produce the calcium acid salt and boric acid in solution. These reaction products are then treated with a slight excess of anhydrous ammonia or ammonium hydroxide to produce ammonium pentaborate and the calcium acid salt.

The mechanism of this reaction in water is illustrated by the following two-step process utilizing colemanite, empirical formula $Ca_2B_6O_{11}\cdot 5H_2O$, as the borate ore, and acetic acid as the acid component:

1) $Ca_2B_6O_{11}\cdot 5H_2O + 4\ CH_3COOH \rightarrow 2Ca(OOCCH_3)_2 + 6H_3BO_3$ 2) $2Ca(OOCCH_3)_2 + 6H_3BO_3 + 1.5\ NH_4OH \rightarrow 1.2(NH_4)B_5O_8\cdot 4\ H_2O + 2\ Ca(OOCCH_3)_2 + 0.3\ NH_4OH$ For optimal results, the reaction between the borate ore and the acid should be substantially completed prior to the addition of the ammonia.

The preferred ore for use in the present invention is colemanite. Although colemanite is a borate ore, it is chemically considered as a carbonate. When colemanite is reacted with glacial acetic acid or a strong mineral acid, the typical carbonate reaction of profuse foaming is produced. This foaming effectively cools the reaction, and makes contact between the acid and the colemanite much more difficult. In its natural states, colemanite ore includes calcite. When contacted with an acid, calcite produces the typical acid/carbonate reaction. This reaction produces carbon dioxide gas, which in turn makes the foam:

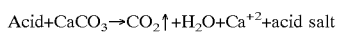

$$Acid + CaCO_3 \rightarrow CO_2\uparrow + H_2O + Ca^{+2} + acid\ salt$$

Although colemanite is the preferred ore, other borate ores that naturally contain calcium may also be used in the inventive process. A non-limiting list of such calcium borate ores includes ulexite, pandermite, danburite and datolite.

Acetic acid is the preferred acid for use in the reaction. However, other closely related organic acids, such as formic, oxalic and malonic acids, may also be used. Of the listed acids, acetic acid is the most preferred, followed in succession by formic, oxalic, and malonic acids. The above-mentioned acids are favored due to their dissociation constants Ka. The term pKa is defined as the —log Ka. The lower the value for pKa, the "stronger" the acid, and the greater the degree of dissociation. Formic, oxalic and malonic acids all have pKa values less than that of acetic acid, and therefore, are stronger acids than acetic acid.

To facilitate the reaction between the ore and the acid, it is preferred to granulate the ore to a particle size of about 200 mesh or less. The granulated ore is then directly reacted with undiluted glacial acetic acid. Although diluted acids may be utilized, chemical literature suggests that the activity, or the level of dissociation of acetic acid, substantially decreases with dilution of the acid, thereby reducing the apparent reactivity. Thus, the use of diluted acids typically lengthens the reaction time.

If certain strong mineral acids, such as hydrochloric acid and nitric acid, were used to treat the calcium borate ores, and the reaction products were thereafter treated with ammonia, a solution containing higlhly-soluble calcium acid salts (e.g., calcium chloride and calcium nitrate) would be obtained. Due to the extreme solubility of these dissolved calcium salts, the leach resistance obtained when treating the substrate with these highly soluble salts would not be appreciably increased when compared to the leach resistance obtained using the water-soluble sodium borates.

In addition, treatment of the calcium borate ores with other strong mineral acids, such as sulfuric acid and phosphoric acids, and subsequent treatment with ammonia results in the formation of precipitated calcium acid salts of those acids (calcium sulfate and/or calcium phosphates). In this event, all, or nearly all, of the calcium is removed from the solution, thereby resulting in a product with little resistance to leaching.

A key aspect of the present invention is that the matrix of the inventive composition must retain a significant calcium content. Although it is the boron compounds that provide the actual protection to the substrate against fire, wood decay fungi and insects, these boron compounds must be provided in a matrix that substantially reduces their ability to leach out under commonly-encountered environmental conditions, such as high humidity, rain, fog, and exposure to soil moisture and dew. Calcium is believed to act as a fixative agent in this matrix to dramatically increase the resistance of the substrate to the leaching out of the boron compounds. Calcium salts obtained from the reaction between the calcium borate ore and acetic acid, and the subsequent treatment with ammonia, act to increase the resistance of the boron compounds to leaching out of the substrate. On the other hand, calcium salts obtained from the strong mineral acids listed above are either easily leached out of the substrate due to their high solubility, or they form precipitates prior to their application to the substrate. As a result, the level of protection against leaching provided by these salts of strong mineral acids is often inadequate.

When acetic acid is used in the reaction with colemanite, the calcium acetate salt is obtained. Calcium acetate salts are particularly preferred as they are less soluble than the extremely soluble salts obtained with hydrochloric and nitric acids, and yet are considerably more soluble than the substantially insoluble salts obtained with sulfuric and phosphoric acids.

Preferably, only a slight excess of residual ammonia is present in the formulation, as a slight excess of ammonia aids in keeping both the ammonium pentaborate and calcium salt in solution. It is preferred to avoid too great an excess of ammonia, because a large excess of ammonia will normally result in the formation of an objectionably large amount of insoluble calcium compounds, such as calcium hydroxide, lime or calcium tetraborate. Although the formation of a small amount of insoluble calcium compounds is permissible, the formation of these insoluble compounds has the undesirable effect of removing some of the calcium from the reaction solution. Accordingly, the pH of the reaction solution should preferably be maintained between about 5 and 9, more preferably between about 5 and 8, and most preferably between about 5.5 and 6.6. Preferably, water comprises the solvent for the reaction.

When preparing large batches of the inventive composition, it is preferred to mix previously combined portions of the initial ingredients. Sequentially adding "combined portions" of starting materials to a reaction vessel is a known practice in industry to facilitate the preparation of larger batches of combined reactants than might otherwise be obtained if large amounts of the initial ingredients were reacted directly with each other. For example, if one were to add large quantities of acetic acid, e.g. 1200 ml, directly to large quantities of colemanite, e.g. 3 pounds (1362 gm), in a reaction vessel the resulting mixture would be difficult to mix, and would foam profusely. However, when smaller "combined portions" are prepared, each containing previously-combined lesser quantities of acetic acid, e.g. 200 ml, and colemanite, e.g. 0.5 pound (227 gm), and added incrementally to the reaction vessel, the difficulties obtained when using larger portions of the respective starting materials are minimized.

In addition to the foregoing benefits, the use of combined portions of the ingredients also minimizes any adverse effects on the reaction that may be caused by other inorganic metals that are naturally present in the ore, such as magnesium, aluminum, iron and celestite ($SrCO_3$), calcite ($CaCO_3$), and silica. These inorganic metals may react with acetic acid to form water-soluble acetates, thereby reducing the amount of acid available to react with the colemanite portion of the ore. Reacting previously combined mixtures of colemanite and acetic acid is more effective, and improves the efficiency of the reaction.

Although not required, the addition of an oxidant, such as hydrogen peroxide, to the colemanite/acetic acid reaction solution may assist the acetic acid by artificially increasing its ionization, or "strength". When large quantities of colemanite are to be reacted, the hydrogen peroxide may be introduced along with the combined portions of colemanite and acetic acid.

Cellulosic materials are hydrophobic, and therefore, are not easily penetrated by water and water-based solutions containing solids. Thus, it is also preferred to add a surfactant to the formulation. The use of a surfactant reduces the surface tension of water-based solutions containing solids, thereby aiding the penetration of the reaction products into the substrate being treated. Preferably, an amphoteric surfactant that can perform under either acidic or basic conditions is used. Amphoteric surfactants are particularly effective at the mildly acidic pH of about 6.0–6.5, which is within the preferred range in the present invention. The amount of surfactant added to the reaction mixture is based on volume and solids content. At less volume of solution, less surfactant is required. When the solution has high solids content, more surfactant is generally required, since solutions having higher solids content have a greater surface tension. The surfactant lowers the surface tension, thereby permitting the solution and solids to disperse into the cellulose, which is naturally hydrophobic. When a surfactant is employed, it is added to the reaction solution at the end of the formulation process.

The resulting solution containing the dissolved boron salts has an apparent B.A.E. (boric acid equivalent), which is based upon the amount of dissolved boron in the solution. Thus, the B.A.E. of the solution is substantially controlled by two variables, namely the quantity of the calcium borate ore (the source of the boron) used in the reaction, and the final volume of the solution.

After the inventive composition has been prepared, it may be applied to the substrate utilizing application methods generally known in the art for applying protective treatments to substrates, such as immersion and pressure treatment.

Examples 1–7, below, illustrate methods for preparing the inventive composition. The methods described in these examples are illustrative only, and are not intended to limit the scope of the invention in any manner. In each example, the calcium borate ore used was colemanite. The colemanite ore used in Examples 1, 2 and 7 originated from Turkey, while the colemanite used in Examples 3–6 originated from the United States of America. Colemanite ore obtained from different sources will normally differ somewhat in purity. Therefore, the actual amount of boron and calcium present in a particular amount of colemanite, e.g., 1 kg, obtained from one source will differ somewhat from die amount present in 1 kg obtained from another source. If desires, a colemanite ore sample can be assayed in order to determine the amount of boron and calcium present in the particular sample.

EXAMPLE 1

A 2-liter beaker containing 500 ml of tap water was placed upon a combination stirrer/hot plate. Moderate to slow stirring was initiated, and 250 grams of granulated Turkish colemanite (200 mesh or less) was stirred into die water. After all colemanite had been added, the stirring was increased as needed, and was continued until it was apparent that all of die colemanite was thoroughly mixed and wet. 150 ml glacial acetic acid was slowly added to the water/colemanite mixture in increments of about 25–30 ml. The stirring was continual, and no additional acid was added after each incremental addition until the foaming from the previous increment had subsided. The resulting mixture was heated, with stirring, to about 50°–60° C. Profuse foaming again occurred as the temperature approached 60° C. This foam was thick, dense and heavy, such that the mixing was inhibited. Water was applied to the mixture to disperse the foam and aid mixing. The foam decreased with increased heat and stirring until die temperature reached about 70° C., at which time no foam was present. The mixture was dark gray and stirred freely. Heat and stirring was continued for 15–20 minutes after the foam had dispersed, assuring completion of the reaction with the acid. The pH of the mixture was about 4.6.

With continued stirring under heat, 150 ml of 28% ammonium hydroxide was slowly and cautiously added to the hot acid mixture in increments of about 25–30 ml. A watch glass of appropriate size was used to cover the beaker and the contents after the addition of each incremental portion of the ammonium hydroxide. Stirring was continued throughout this incremental addition, and the whitish reaction products of the ammonia addition thoroughly dissipated. The reaction mixture changed coloration from a dark gray mixture to grayish white after each addition of ammonium hydroxide. Tile temperature was raised to 80°–90° C., and maintained for one hour under stirring and cover.

After one hour of heat and stirring, the heat was removed and stirring was stopped. The volume of the mixture (solids plus liquid) was adjusted to 1500 ml with hot tap water, using the beaker scale. Upon standing, it was observed that the liquid portion of the mixture was clear, but that a portion of gray muddy solids remained. The hot solution was then stirred to re-suspend the undissolved solids, and the mixture was filtered by vacuum through a No. 4 Whatman filter and Buchner funnel of appropriate size. The resulting filtrate was collected and saved. The collected filter cake was suspended in 400 ml of hot tap water and heated to about 50° C., under stirring for 15–30 minutes. This mixture is then filtered hot as before, and the wash filtrate was added to the original filtrate, discarding the collected filter cake (188.4 gm) as insoluble residue. The combined filtrates totalled about 1400 ml in volume, and had a final pH of 8.06. The combined filtrate solution had a slight odor of ammonia.

The percentage of boron in the filtrate was 0.75%, which corresponds to a percent boron per liter of solution of 1.05%. The percentage of calcium in the filtrate was 0.94%, which corresponds to a percent calcium per liter of solution of 1.31%. The B.A.E. percentage (per liter) was 6.00%.

EXAMPLE 2

A 2 liter beaker containing 500 ml of tap water was placed upon a combination stirrer/hot plate. Moderate to slow stirring was initiated, and 250 grams of granulated Turkish coleinanite (200 mesh or less) was stirred into the water. After all colemanite had been added, the stirring was increased as needed, and was continued until it was apparent that all of the colemanite was thoroughly mixed and wet. 150 ml glacial acetic acid was slowly added to the water/colemanite mixture in increments of about 25–30 ml, as in the previous example. The stirring was continual, and no additional acid was added after each incremental addition until the foaming from the previous increment had subsided. The resulting mixture was heated, with stirring, to about 80° C. The mixture began to foam profusely at 60° C., becoming heavy and dense, and inhibiting stirring. Water was sprayed directly onto the mixture to disperse the foam and aid mixing. The foam continued to persist, but decreased with rising temperature and stirring as before, and was completely dissipated at about 70° C. After about one hour at 80° C., the mixture was filtered as before when hot. The filtrate was saved, and the collected filter cake was suspended in 400 ml of tap water, and under stirring was heated to 50°–60° C. for 30 minutes, and filtered again. The wash filtrate was combined with the original filtrate, and the filter cake (76.1 gm) was discarded. The combined filtrate had a pH of about 4.92 and a volume of about 1200 ml.

To the combined filtrate, increments of 28% ammonium hydroxide were added as before until the solution reached a pH near 6.5. Successive increments of ammonium hydroxide yielded a solution having the following pH and temperature:

| Ammonium hydroxide (ml) | pH | Temperature (° C.) |
|---|---|---|
| 20 | 5.23 | 47.1 |
| 40 | 5.56 | 52.6 |
| 60 | 5.83 | 57.9 |
| 70 | 6.06 | 62.5 |
| 75 | 6.18 | 63.2 |
| 80 | 6.30 | 72.0 |

The final volume was 1350 ml.

The percentage of boron in the filtrate was 1.70%, which corresponds to a percent boron per liter of solution of 2.23%. The percentage of calcium in the filtrate was 2.69%, which corresponds to a percent calcium per liter of solution of 3.63%. The B.A.E. percentage (per liter) was 12.74%. The use of a lesser amount of ammonia in this example when compared to the amount utilized in Example 1 resulted in a smaller amount of insoluble residue, and a higher boron and calcium content in the final solution.

EXAMPLE 3

The same process was followed as in Example 2, except that domestic United Stated colemanite was used in place of Turkish colemanite. After the addition of the acid, the mixture was heated under stirring to a temperature of 80° C. for one hour. No second occurrence of foaming occurred at temperatures near 50°–60° C., as with Turkish colemanite. The acid mixture changed coloration during the hour of digestion from a light tan to a dark gray. The mixture was also filtered hot, and the hot filter cake suspended in 400 ml of tap water, heated as before, and filtered again. The wash filtrate and the original filtrate were combined, and the washed filter cake discarded. The residue weight for this example was 84.4 gm, and the acid filtrate had a pH of about 4.55.

To the combined filtrate, increments of 28% ammonium hydroxide were added as before until the solution reached a pH near 6.5. Successive increments of ammonium hydroxide yielded a solution having the following pH and temperature:

| Ammonium hydroxide (ml) | pH | Temperature (° C.) |
|---|---|---|
| 20 | 4.89 | 58.9 |
| 40 | 5.22 | 61.4 |
| 50 | 5.41 | 62.9 |
| 60 | 5.63 | 66.9 |
| 70 | 5.92 | 73.7 |
| 75 | 6.06 | 74.0 |
| 80 | 6.30 | 80.7 |

The final volume was 1090 ml.

The percentage of boron in the filtrate was 1.94%, which corresponds to a percent boron per liter of solution of 2.12%. The percentage of calcium in the filtrate was 3.15%, which corresponds to a percent calcium per liter of solution of 3.45%. The B.A.E. percentage (per liter) was 12.14%.

EXAMPLE 4

The same conditions were used as in Example 3, except that the digest time was changed to 2 hours at 80° C. The filtrate pH before the addition of the ammonium hydroxide was 4.72. After washing the filter cake, 98.1 gm of residue was discarded. 70 ml of ammonium hydroxide was required to achieve a pH of 6.4. The final volume was 1165 ml.

The percentage of boron in the filtrate was 1.36%, which corresponds to a percent boron per liter of solution of 1.60%. The percentage of calcium in the filtrate was 1.76%, which corresponds to a percent calcium per liter of solution of 2.0%. The B.A.E. percentage (per liter) was 9.14%.

EXAMPLE 5

The same process was followed as in Example 3, except that an oxidant, hydrogen peroxide, was added to the reaction mixture. In this example, one mole (115 ml) of hydrogen peroxide (30%) was added along with the 150 ml of acetic acid. The foaming during digestion was longer in duration, and the mixture turned a yellow-brown color. After filtering the mixture and washing the filter cake, the solution was golden-brown in color, but completely clear and transparent. The combined filtrate had a pH of 4.5. The collected residue measured 67.2 gm. It required 75 ml of 28% ammonium hydroxide to achieve the final pH of 6.25 at 70° C. The final volume was 1310 ml.

The percentage of boron in the filtrate was 1.21%, which corresponds to a percent boron per liter of solution of 1.58%. The percentage of calcium in the filtrate was 1.58%, which corresponds to a percent calcium per liter of solution of 2.0%. The B.A.E. percentage (per liter) was 9.06%.

EXAMPLE 6

The same process was followed as in Example 5, except that only 0.44 moles (50 ml) of hydrogen peroxide (30%) was used. After 1 hour of acidic digestion, the filtrate pH measured 4.56. It required only 65 ml of 28% ammonium hydroxide to attain a pH of 6.30. The final volume was 1210 ml, and the color was pale yellow. The weight of the residue was about 80 grams.

The percentage of boron in the filtrate was 1.48%, which corresponds to a percent boron per liter of solution of 1.79%. The percentage of calcium in the filtrate was 2.69%, which corresponds to a percent calcium per liter of solution of 3.25%. The B.A.E. percentage (per liter) was 10.23%.

EXAMPLE 7

A procedure similar to that in Example 3 was followed, except that the 150 ml of glacial acetic acid was replaced with 120 ml of 90% formic acid. In this case, the mixture does not foam as much as in the previous examples, Rather, it appeared to have an effervescent activity. The foam generated was less dense than in the previous examples, but the foam that was generated persisted up to temperatures of about 80° C.

After filtering and washing the filter cake as in previous examples, the acidic filtrate had a pH of about 4.13. After adding 75 ml of 28% ammonium hydroxide, the pH was still only 5.83, but the solution was becoming unstable as indicated by the presence of an extremely fine flocculent precipitate which would not dissipate with the continued stirring or heating. The solution was filtered resulting in a final volume of 1310 ml, and a pH of 5.83. The collected residue from washing the filter cake was only 30.2 gill.

The percentage of boron in the filtrate was 2.45%, which corresponds to a percent boron per liter of solution of 3.21%.

The percentage of calcium in the filtrate was 3.25%, which corresponds to a percent calcium per liter of solution of 4.26%. The B.A.E. percentage (per liter) was 18.30%.

The following examples were performed to investigate the properties of substrates treated with the inventive solution. Examples 8 and 9 investigated the ability of treated substrates to resist leaching of the composition. Example 10 investigated the ability of treated substrates to retard flames. Example 11 investigated the ability of treated substrates to resist subterranean termites. Example 12 investigated the ability of treated substrates to resist fungal growth. The test solutions utilized in Examples 8–12 were prepared in accordance with the general process described in Example 1, with the exception that a surfactant was added at the end of the formulation process. In these examples, approximately 10 ml of the amphoteric surfactant Mirataine JC-MA, available from Rhone-Poulenc was added per liter to the inventive solution, to provide a concentration of about 0.8% of the surfactant.

EXAMPLE 8

Southern yellow pine blocks were utilized as the substrate. Five gallons (18.93 liters) of the inventive solution were prepared using 5 pounds (2.27 kg) of colemanite having a target B.A.E. of 8.9%. The actual B.A.E. of the conditioned blocks prior to leaching was 1.7%. The objective of the test was to determine the % B.A.E. remaining in the pine blocks after they had been treated with the inventive solution and exposed to leaching in deionized water.

The pine blocks were impregnated according to AWPA Standard E11-87, titled *Standar Methods of Determining the Leachability of Wood Preservatives*. This publication, as well as the remaining technical publications cited herein, are incorporated by reference. The AWPA Standards are standard procedures promulgated by and under the jurisdiction of the American Wood Preservers' Association. AWPA standard methods are well known to those of ordinary skill in the art of wood preservation, and further details of the published methods are readily available.

In brief, the test method includes the conditioning of the blocks, followed by treatment of the blocks with the test solution. In the conditioning step, ¾ inch (1.9 cm$^3$) cubes of southern yellow pine sapwood were first conditioned at about 23±0.50° C. and 50±2% relative humidity, until they attained a moisture content of about 19%. These blocks were then weighed (moisture content can be determined by oven drying) to obtain the conditioned, untreated weight.

During the treatment step, eight of the conditioned blocks were placed in a suitably-sized beaker. Weights were placed atop the blocks to prevent them from floating. The beaker containing the blocks was placed inside a treatment chamber, and a vacuum was applied to reduce the pressure to 13.3 kPa (3.94 inches of Hg) or less. The reduced pressure was maintained for 20 minutes. At the end of this time period, the treatment solution was allowed to enter the beaker containing the blocks via appropriately-arranged valves, until the blocks were completely covered, or immersed, in the solution. The vacuum was broken, and the beaker containing the submerged blocks was removed from the apparatus. The beaker was covered, and the blocks remained immersed in the solution for at least 30 minutes. Each individual block was removed, lightly wiped to remove surface liquid, and immediately weighed. The difference between the conditioned weight and the wet-treated weight comprises the amount of treatment solution retained by each block.

Following treatment, the blocks were spaced out on trays, and allowed to dry at room temperature. After drying, the blocks were placed in a conditioning environment of about 23±0.50° C., and 50±2% relative humidity for 21 days.

After the treatment and conditioning, the blocks were subjected to the leaching test according to the AWPA Standard E11-87. Six of the treated and conditioned blocks were impregnated with deionized water, following the same procedure used to treat the blocks with the treatment solution. The remaining blocks were maintained as controls. The blocks were then placed into the leaching flask of the apparatus, and washed with deionized water, reaching a total volume of 300 ml. The blocks must be completely submerged during the leaching test. The water is maintained at a temperature of 23±0.50° C., tinder slow and constant stirring.

At intervals of 6, 24 and 48 hours (and each 48 hour interval thereafter), the leachate (water) was removed and replaced with an equal amount of fresh deionized water. The leachate removal and replacement with fresh deionized water continued for 14 days (336 hours). The leachate was analyzed at each removal interval, and both leached and unleached (control) blocks were analyzed for preservative content to determine the permanence, or level of treatment retained, at the end of 14 days. In this test, the final B.A.E. at the end of 336 hours was found to be 0.38%. Although a B.A.E. of 0.38% exceeds a threshold level of 0.35% for use against termites, solutions having a higher B.A.E. are normally desires to obtain acceptable resistance to wood decay fungi.

EXAMPLE 9

The solution prepared for use in this example was similar to that in Example, but having a higher target B.A.E. In this instance, five gallons (18.93 liters) of solution were prepared using 10.5 pounds (4.77 kg) of colemanite ore, and the target B.A.E. was 14.7%. The actual B.A.E. in the conditioned blocks prior to leaching was 5.995%. This solution was applied to southern yellow pine blocks by the impregnation treatment.

These treated blocks were subjected to the leaching test according to the AWPA Standard E11-87 for 624 hours. In this case, the B.A.E. was 1.469% after 624 hours. It was observed that the B.A.E. only dropped from 1.496% to 1.469% during the period from 144 hours of leaching treatment to 624 hours of leaching treatment. Thus, it was apparent that most of the treatment compounds remained in the blocks for substantial periods of time.

EXAMPLE 10

The following example describes the use of the claimed composition as a fire retardant. A solution for treating plywood strips for flame retardancy having a B.A.E. of 9.77% was prepared.

Six plywood strips were cut to dimensions of 2.25 inches× 24 inches (5.71 cm×60.96 cm). Each strip was conditioned to constant weight by drying at 50% relative humidity for approximately 48 hours at 20° C., and then weighing the dried strip. The strips were thereafter separated into two groups (of three strips each) for immersion into the inventive solution. One group of strips was immersed in the solution for three minutes, and the other group was immersed for six minutes.

Following immersion, the treated strips were again conditioned to constant weight as described above, and weighed. The level of retention of the boron products on the strips was determined by subtracting the constant weight of the strips prior to immersion from the constant weight of the strips after immersion. In the present example, the strips immersed for three minutes had an average level of retention of 8.4% (wt.), meaning that the weight of the treated strips exceeded the weight of the untreated strips by 8.4%. The strips immersed for six minutes had an average retention of 11.5%. This indicates that an increased immersion time results in an increased amount of products being retained on the samples.

The treated plywood strips were then subjected to testing for flame spread rating (FSR). Two of the three strips in each of the two groups of strips (i.e., the three-minute immersion group, and the six-minute immersion group) were tested in a 2-foot (60.96 cm) tunnel.

The flame spread rating for a two-foot (60.96 cm) tunnel is arrived at by observing the maximum distance that a flame tip extends from the bottom surface of the two-foot tunnel during the course of a test. The distance of the flame generated by an asbestos board control sample is used as a control value. The distance of the flame generated by the control board is due only to the deflection of the flame, without any "fuel" contributing to the length of the flame. This value is deducted from the length of the flame generated by the test sample to determine the length of the flame generated solely by the sample itself, or in other words, the "fuel" subjected to the flame. The resulting number is modified by a standard multiplier to arrive at the FSR rating that one would expect to find by use of a ftill-scale 25-foot (762 cm) tunnel of the type in which such tests are normally performed.

Even though the present tests were performed in a 2-foot tunnel, such small-scale fire tests still receive the same type of performance ratings and accreditation as if the tests were performed on a full-scale tunnel. Underwriters' Laboratory of Northbrook, Ill., uses a special formula to determine FSR ratings. Under this formula, the FSR ratings are given in absolute, dimensionless numbers. A lower FSR rating indicates better flame retardancy than a higher rating. The method for computing FSR ratings is described in ASTM E-84.

The test results indicated that the two strips of 11.5% average retention had an average FSR of 21.9. The two strips of 8.4% average retention had an average FSR of 26.6.

As may be observed from the test results, the strips of higher average retention (11.5%) had superior FSR ratings than those strips of lower average retention (8.4%). Average retention of a wood strip may be increased by, among others, utilizing a treatment solution of reaction products having a higher B.A.E., increasing the immersion time of the wood in the solution, or varying the method of application of the solution, such as by pressure treating rather than dipping.

EXAMPLE 11

The following example illustrates the resistance of wood samples treated with the inventive composition to subterranean termites. Tile tests were designed to determine the level of boric acid equivalent that is effective for killing 100% of the population of subterranean termites in a test sample. In addition, the tests were designed to measure weight loss occasioned by termite feeding damage to the treated wood samples. Two sets of tests were performed on samples that had been pressure treated with the inventive composition. The first set of tests had a duration of four weeks, and the second set had a duration of eight weeks.

The inventive solution was prepared in accordance with the general procedure described above, and diluted to provide treatment solutions containing B.A.E. levels of 0.0625, 0.125, 0.25, 0.50 and 1.0%, respectively.

Five separate cubes of ¾ inch (1.9 cm³) southern pine sapwood were tested at each of the five dilution levels. As a control, cubes exposed only to water rather than to the treatment solution were similarly tested. The cubes were weighed tinder ambient moisture conditions, and transferred to a heavy wall filter flask (1000 nil capacity) equipped with a separation column. The flask was then brought to a vacuum of 21 inches (53.3 cm) Hg, and held at that level for twenty minutes. The vacuum was then broken, and a sufficient amount of the particular treatment solution was added to the flask so that the cubes were submerged in solution. All cubes at a particular dilution were treated together in the same filter flask. After thirty minutes, the submerged cubes were removed from tile filter flask, and placed in a 500 ml stainless steel pressure chamber along with 350–400 ml of the treatment solution. Tile lid of the chamber was secured, and 30 psi (2.1 kg/cm²) of pressure (nitrogen) was introduced to position the chamber piston to the top of the chamber. A top valve was opened as the piston rose in the chamber to evacuate any air from the chamber, thereby establishing "zero" headspace in the pressure chamber. The pressure inside the chamber was increased to 100 psi, and maintained at this level for one hour.

The pressure was then reduced to atmospheric pressure, and the cubes were removed from the chamber. The cubes were weighed, and allowed to air dry under ambient conditions. The cubes were then weighed again to determine the weight gain from the pressure treatment.

The specific test procedures for the termite resistance investigation were adapted generally from the AWPA Standard E1-72, titled *Standard Method for Laboratory Evaluation to Determine Resistance to Subterranean Termites*. However, some variations from the E1-72 Standard were observed (some variations now included in AWPA Standard E1-97). One variation from the E1-72 Standard included oven drying the treated cubes for 24 hours at 105° C. both before and after the exposure to termites. Another variation involved the actual counting of the termite populations in each container before and after each test. This was done to permit the calculation of the actual survival percentage, rather than subjective sortings of termite survival into broad classes. Yet another variation involved the use of sterilized moistened sand and vermiculite in the container instead of pure sand. The use of sterilized moistened sand and vermiculite avoided the necessary periodic addition of water when pure sand is used. Lastly, Standard E1-72 provides for a test duration of only four weeks, whereas one of the tests in this study lasted for eight weeks.

After the cubes were oven-dried for 24 hours at 105° C., they were weighed to record their initial oven-dry weight. All test cubes were then conditioned for 42.5 hours above water in a closed container. One cube at each concentration was re-weighed. The calculated equilibrium wood moisture content was 17.5±2.3%.

Each cube was placed in a plastic cylindrical container, 2 inches (51 mm) inside diameter by 1⁷⁄₁₆ inches (35 mm) inside height. The container included approximately 40 ml of moistened sterilized sand/vermiculite mixture. The sand/vermiculite mixture was taken from a batch consisting of 1350 ml sand, 175 ml vermiculite and 250 ml of bottled water. The sand/vermiculite mixture was prepared by oven drying the components at 105° C. for 24 hours, and then thoroughly mixing the components with each other and with water. One hundred native eastern subterranean termites, *Recticulitermes flavipes*, were added to each container.

The results from four-week ($1^{st}$ test) and eiglht-week ($2^{nd}$ test) exposure of the subterranean termite workers *Rectictlitermes flavipes*, including Means (±SD) for percent survival, percent wood weight loss, and percent equilibrium wood moisture content ($2^{nd}$ test only) are provided in Table 1.

TABLE 1

| B.A.E. of treating solution | First test: 4 weeks | | Second test: 8 weeks | | |
|---|---|---|---|---|---|
| | Mean ± SD % Termite survival | Mean ± SD % wood weight loss | Mean ± SD % moisture content | Mean ± SD % termite survival | Mean ± SD % wood weight loss |
| 1.000% | 0.0 ± 0.0 | 3.39 ± 0.21 | 18.5 ± 0.4 | 0.0 ± 0.0 | 1.41 ± 0.15 |
| 0.500% | 0.0 ± 0.0 | 1.79 ± 0.10 | 18.0 ± 0.3 | 0.0 ± 0.0 | 1.26 ± 0.13 |
| 0.250% | 0.0 ± 0.0 | 1.54 ± 0.22 | 18.5 ± 0.1 | 0.0 ± 0.0 | 1.47 ± 0.11 |
| 0.125% | 0.0 ± 0.0 | 1.03 ± 0.17 | 17.7 ± 0.2 | 0.0 ± 0.0 | 1.59 ± 0.14 |
| 0.0625% | 0.0 ± 0.0 | 1.08 ± 0.15 | 16.8 ± 0.6 | 0.0 ± 0.0 | 1.62 ± 0.17 |
| Water only | 70.6 ± 11.4 | 4.91 ± 0.82 | 15.1 ± 0.2 | 66.8 ± 23.4 | 11.79 ± 2.67 |

After four weeks, all of the termites in test containers containing wood cubes treated with tile inventive Solution were dead, regardless of tile treatment level. In fact, observations made after just two weeks revealed that termites exposed to cubes treated with the inventive solution were already dead or dying, regardless of the level of % B.A.E.

Since all of the termites were dead at the end of four weeks, it was not possible to determine a threshold level of % B.A.E., or an optimum level of treatment (dilution). A second test identical in procedure to the first test was conducted, except that the second test lasted for eight weeks. The second test had a two-fold purpose. First, to confirm that all termites were dead at the end of four weeks, and second, to see if doubling the exposure time to the termites would produce a significant difference in weight loss due to termite feeding, in order to determine a threshold value. With the exception of the control cubes treated only with water, the same treated cubes were used in the second test as were used in the first test.

As in the first test, all of the termites exposed to the cubes treated with the inventive solution were dead at the end of four weeks. Visual examination of each cube revealed that there was no evidence of termite feeding on any cube treated with the inventive solution containing a B.A.E level of either 0.5% or 1.0%. Some evidence of termite feeding (surface etching or grazing) was evident on all of the remaining cubes.

With the exception of tie weight of the cubes treated with the 0.5% and 1.0% B.A.E. level after the first test, the mean percent wood weight losses of the remaining test cubes (0.0625, 0.125 and 0.25% on each test; 0.5% and 1.0% on the second test) due to termite feeding was less than 1.7%.

The mean percent wood weight losses for the 0.5% and 1.0% cubes after the first test were 1.79% and 3.39%, respectively. However, since no evidence of termite feeding was evident on these cubes, tile weight losses recorded for the cubes at those B.A.E. levels were probably due to a loss of treatment chemicals as a result of the oven drying at 105° C. Since water-soluble borate preservatives are removed from wood by volatilization within steam when wood is dried at high temperatures, borate-treated wood samples are typically dried at temperatures below 55° C. Since tile test cubes were dried once (first test) or twice (second test) at high temperatures before exposure to termites, the protection observed against termites is noteworthy. Although termites were used in this test, similar results are expected when the composition is used to treat substrates against other wood-boring insects such as powder-post beetles and carpenter ants.

EXAMPLE 12

The following example illustrates the resistance of wood samples treated with the inventive composition to wood decay fungi.

The inventive solution was prepared in accordance with the general procedure described above, and was diluted to provide treatment solutions containing levels of 1.0%, 0.5%, .0.025%, 0.125% and 0.0625% B.A.E., as in Example 11. Five separate cubes of both red oak sapwood cubes and southern pine sapwood cubes were tested at each dilution level. The cubes were sized at ¾ inches (1.9 cm$^3$) as in the previous example.

The cubes were conditioned by heating them in a hot air convection oven at 50° C. for a period of four days. The untreated cubes were then allowed to return to ambient temperature at 30% relative humidity for two days. The cubes were weighed, and then vacuum and pressure treated with the test solution in similar fashion to the cubes of Exainple 11. The treated cubes were then weighed after treatment to determine the weight gain due to the treatment.

The tests were performed in accordance with AWPA Standard E10-91, titled *Standard Methods of Testing Wood Preservatives by Laboratory Soil-Block Cultures*. The red oak cubes were exposed to decay fungi specific to white rot decay, and the southern pine cubes were exposed to fungi specific to brown rot decay.

Fungi were grown prior to use in soil cube cultures on malt agar petri plates (2% malt, 1.5% AGAR). Setup for the assay was as detailed in Standard E10-91. The jars used for testing contained 200 ml of soil, having a pH of 6.39. Water was added to the soil, and the soil was allowed to hydrate for 24 hours before sterilizing. Prepared soil bottles were autoclaved once for 60 minutes, allowed to sit for 48 hours, and re-autoclaved to ensure complete sterility. Feeder strips of birch were used to establish fungal growth in the jars prior to the addition of the test cubes. After the second autoclaving and cooling, feeder strips were inoculated with four 2–3 mm squares of fungal inoculum cut from the leading edge of the mycelium in the petri dish cultures. The lids were loosely closed to ensure sterility while allowing air exchange. Test cubes were added aseptically after three weeks of incubation. The test cubes were reconditioned prior to exposure to fungi by drying to constant weight in a forced-draft oven at 40° C. The cubes were sterilized before use by heating to 100° C. for 20 minutes, and then placed in the jars with their respective cross-sectional faces centered in contact with mycellium-covered feeder strips.

The treated red oak cubes were exposed for 12 weeks to the white rot decay fungi, specifically *Phlanerochaete chrysosponrm*, *Irpex lacteus*, and *Trametes versicolor*. Two sets of red oak cubes were used as experimental controls, red oak cubes that were treated but not exposed to the fungi, and red oak cubes that were treated with water only and exposed to the white rot decay fungi.

The treated southern pine cubes were exposed for 12 weeks to brown rot decay fungi, specifically to, *Leucogyrophana pinastri*, *Gloeophyllum trabeum*, and *Postia placenta*. Two sets of southern pine cubes were used as experimental controls, southern pine cubes that were treated but not exposed to the fungi, and southern yellow pine cubes that were treated with water only and exposed to the brown rot decay fungi.

The various cultures were inspected on a weekly basis for growth, sterility and moisture content. Six weeks into the incubation, 5 ml of water was added aseptically to each jar to maintain appropriate moisture content for fungal growth. The test cubes were evaluated for fungal colonization at both six and twelve weeks after initial exposure.

The results of a visual evaluation of soil block assays after twelve weeks are provided in Table 2. The numerical results provided in the Table are arbitrary numbers based upon the following observations. The numbers reported in the Table represent an average of five visual evaluations:

3=mycelium covering entire block, extensive growth
2=mycelium moving up sides of test block, good growth
1=mycelium colonizing soil and feeder strips, limited colonization of the block observable (hyphae may be penetrating internally)
0=no growth Values less than one indicate a possible zone of inhibition. The tipper row in the Table for each wood sample represents the % B.A.E. of the treatment solution.

TABLE 2

|  | 1.0 | 0.5 | 0.25 | 0.125 | 0.0625 | Water control |
|---|---|---|---|---|---|---|
| Southern yellow pine: | | | | | | |
| G. trabeum | 0.9 | 1.8 | 1.9 | 2.0 | 3.0 | 3.0 |
| P. placenta | 1.1 | 0.8 | 2.4 | 2.4 | 3.0 | 3.0 |
| L. pinastri | 0.3 | 0.8 | 1.9 | 2.6 | 2.7 | 2.6 |
| Control | 0.0 | 0.0 | 0.0 | 0.0 | 0.0 | 0.0 |
| Oak: | | | | | | |
| P. chrysos. | 1.0 | 1.0 | 1.7 | 2.4 | 3.0 | 3.0 |
| T. versic. | 0.4 | 1.2 | 2.2 | 2.9 | 2.8 | 2.4 |
| I. lacteus | 1.9 | 1.0 | 1.7 | 2.0 | 2.6 | 3.0 |
| Control | 0.0 | 0.0 | 0.0 | 0.1 | 0.0 | 0.0 |

Results of the twelve-week study show a noticeable effect of treatment upon the colonization of the cubes by the fungi. Cubes treated with the inventive solution tended to support little or no growth early in the study. Cubes treated only with water showed extensive colonization by the fungi early in the evaluation period. Some examples during the study show *Irpex lacteus* surrounding, but not approaching the blocks treated at the 1.0% B.A.E. level. For *Trameters versicolor*, the control cube treated only by water suffered complete colonization on all surfaces. Treated cubes show less aggressive attack with increases in treatment levels. Zone lines of inhibition could sometimes be seen at the base of the treated cubes, which suggests that some limited leaching occurred immediately adjacent to the cubes.

The results also indicate that the treatment does inhibit the wood colonization by the fungus. In the samples tested, the treatment level at which effective protection was seen for both the brown rot and white rot decay fungi fell roughly between 0.25% and 0.125% treatment levels. When the performance of each treatment is compared over all exposure conditions from no hazard to fungal hazard, the point at which protection is evident occurs at approximately 0.25% B.A.E. level of the inventive solution. Particular B.A.E. levels effective to provide protection against fungi may vary due to factors such as the manner of application of the treatment solution to the substrate, and the type of wood or other substrate undergoing the treatment.

Although the invention has been described for use in treating wood and other cellulose products, such as plywood and oriented strand boards (O.S.B.), the inventive method may also be applied to other substrates wherein one or more of the problems cited above are commonly experienced. For example, the product may be applied to cotton batting to improve the resistance of batting to flame. Current borate treatment of cotton batting is done with solid dry borates, but a liquid such as produced by the present invention could also be used. Similarly, it is believed that such products could also be used for treatment on regular cellulose insulation, on cellulosic insulation boards of the type used in home construction, and on certain natural and synthetic fibers.

I claim:

1. A method for treating wood and cellulose materials to improve the properties of said materials, said properties including one or more of flame retardancy, insecticidal properties and fungicidal properties, said method comprising the steps of: providing a composition comprising ammonium pentaborate as a first component and one or more soluble calcium compounds as a second component, said components being derived from the reaction a calcium-containing borate ore with an organic acid selected from the group consisting of acetic acid and formic acid, to produce a calcium acid salt and boric acid in solution, and treatment of the calcium acid salt and boric acid solution with sufficient ammonia to form a solution having a pH of about 5–9, said solution including said first and second components; and applying said components to said materials.

2. The method of claim 1, wherein said pH is about 5.5–6.6.

3. The method of claim 2, wherein said pH is about 6.1–6.5.

4. The method of claim 2, wherein said components are applied to said materials by immersing one or more of said materials in said solution.

5. The method of claim 2, wherein said components are applied to said material by pressure-treating one or more of said materials with said solution.

6. A method for preparing boron compounds having flame retardant, insecticidal and fungicidal properties, the method comprising of the steps of: providing a calcium borate ore; mixing a sufficient amount of an organic acid selected from the group consisting of acetic acid and formic acid, with said calcium borate ore in a reaction vessel to dissolve substantially all of said ore and produce a calcium acid salt and boric acid in solution; and adding sufficient ammonia to provide a reaction mixture having a pH of about 5–9.

7. The method of claim 6, wherein said acid is acetic acid, and wherein said calcium acid salt is calcium acetate.

8. The method of claim 6, wherein said calcium borate ore and said acid are mixed to form a first combined portion, and wherein additional calcium borate ore and acid are mixed to form one or more additional combined portions, and wherein said one or more additional combined portions are sequentially added to said first combined portion to comprise said calcium acid salt and boric acid in solution.

9. The method of claim 6, wherein the calcium borate ore comprises colemanite, ulexite, pandermite or combinations of them.

10. The method of claim 9, wherein the calcium-containing borate ore comprises colemanite.

11. The method of claim 6, further comprising the step of adding a surfactant to the reaction vessel.

12. The method of claim 11, wherein said surfactant comprises an amphoteric surfactant.

13. The method of claim 6, wherein said calcium borate ore is granulated prior to reaction with acid in the reaction vessel.

14. The method of claim 13, wherein said ore is granulated to particle sizes of about 200 mesh or less.

15. The method of claim 6, wherein said pH is about 5.5–6.6.

16. The method of claim 15, wherein the pH is about 6.1–6.5.

17. The method of claim 15, further comprising the step of adding an oxidant to the reaction mixture.

18. The method of claim 17, wherein the oxidant comprises hydrogen peroxide.

* * * * *